United States Patent Office 3,595,677
Patented July 27, 1971

3,595,677
PROCESS FOR PRODUCTION OF CALCIUM 5'-NUCLEOTIDE ADDED FOOD
Emiko Hasegawa, Yono-shi, and Itaru Fukinbara and Taneo Nobukuni, Tokyo, Japan, assignors to Asahi Kasei Kogyo Kabushiki Kaisha
No Drawing. Filed June 27, 1967, Ser. No. 649,147
Claims priority, application Japan, July 1, 1966, 41/42,390; Dec. 9, 1966, 41/80,343
Int. Cl. A23l 1/22
U.S. Cl. 99—140   11 Claims

ABSTRACT OF THE DISCLOSURE

A method of enhancing the flavor of food products containing phosphatase comprising admixing with said food at least one calcium salt of a 5'-nucleotide that has a particle size between 50 and 200 mesh and heat treating the mixture to deactivate the phosphatase contained therein, said heat treatment effecting dissolution of said salts whereby said salts remain substantially undecomposed by phosphatase in the food prior to said heat treatment.

---

When the sodium salt of a 5'-nucleotide, which is the form generally used, is added to food containing phosphatase, the flavoring effect is much reduced since the basic structure of 5'-nucleotides is destroyed by the activity of phosphatase.

In contrast, the calcium salts of 5'-nucleotides are only slightly attacked by phosphatase so that the flavoring effect is maintained for a long time.

This invention relates to a process for the production of food which is intended to increase its flavor by adding more than one or two types of calcium 5'-nucleotide to the raw materials for phosphatase-containing food.

The object of this invention is to improve the flavor of phosphatase-containing food. Recently, attempts have been made improve the flavor of food by using disodium 5'-nucleotides, such as disodium 5'-inosinate and disodium 5'-guanylate, in food-processing and several patents have been applied for, e.g. U.S. Pat. 3,104,171.

However, disodium 5'-nucleotides, such as disodium 5'-inosinate and disodium 5'-guanylate, are susceptible to the effect of phosphatase; and disodium 5'-nucleotides, when added to phosphatase-containing food, are disintegrated to the extent of losing almost all their original flavoring effect. In the event a 5'-nucleotide is added to phosphatase-containing food, therefore, it is necessary to use a device for protecting such 5'-nucleotides against the effect of phosphatase. Japanese patent publication No. 27,496/1964 relates thereto. It is stated therein that soya-bean sauce, which is heat-treated to devitalize the phosphatase contained therein, can be improved in flavor through the addition of 5'-nucleotides thereto. In the case of soya-bean sauce, it is indeed possible to improve the flavor by adding, upon heat-treatment, 5'-nucleotides, thereto.

To effectively maintain the protection of processed food against microbial contamination, however, it is undoubtedly desirable for the heat-treating process to follow the flavoring process so that products may be made available directly from the heat-treating process. Also, since most products are changed into gels or sols or solidified through the heat treatment thereof, it is often extremely difficult technically to flavor them with 5'-nucleotides following the heat treatment.

For the reasons given above, it is now necessary to flavor food, prior to the heat-treating process thereof, with 5'-nucleotides, free from the effect of phosphatase.

From such a viewpoint, the present inventors made a series of experiments and eventually discovered that calcium 5'-nucleotides are remarkably slower in solution speed than sodium 5'-nucleotides, the discovery of which has led them to the completion of the present invention.

To explain in more detail, the calcium 5' inosinate and calcium 5' guanylate to be added to food in the invention are preferably between 0.01 and 0.2% in quantity and their solubilities in water are 0.415 gs./100 mls. and 0.062 gs./100 mls. respectively at a temperature of 30° C. Judging from these facts, the quantities of 5'-nucleotide to be added in this invention are mostly within the range of solubility: However, it was discovered that calcium 5'-inosinate and calcium 5'-guanylate are strikingly slower in solution speed than their disodium salts. It is through the utilization of this property that the present invention has been brought to completion.

This will be explained below by examples of experiment:

EXAMPLE 1

Solution speed of disodium salt and calcium salt in 5'-nucleotide.

Method of experiment

Twenty-five mgs. each of the disodium salt and the calcium salt of 5'-inosinic acid and 5'-guanylic acid, which are passable through a 100-mesh screen, were projected into 100 mls. of water and after agitation their solution speed was measured at temperatures of 8° C. and 40° C. The solution speed of these salts was determined using the molecular extinction coefficient for the 5'-inosinic acid 5'-guanylic acid in water solution.

Results of experiment

Shown in Table I.

TABLE I.—SOLUTION RATES OF 5'-NUCLEOTIDE SALTS

|  | Disodium | | Calcium | | | |
|---|---|---|---|---|---|---|
|  | 5'-inosinate | 5'-guanylate | 5'-inosinate | | 5'-guanylate | |
| Temp., °C | 8 or 40 | 8 or 40 | 8 | 40 | 8 | 40 |
| Time: | | | | | | |
| 0 minute, mg./dl | 0 | 0 | 0 | 0 | 0 | 0 |
| 15 minutes, mg./dl | 23.0 | 23.0 | 3.2 | 8.1 | 1.0 | 3.0 |
| 30 minutes, mg./dl |  |  | 5.4 | 10.9 | 2.4 | 4.0 |
| 60 minutes, mg./dl |  |  | 9.2 | 12.3 | 4.8 | 7.2 |
| 120 minutes, mg./dl |  |  | 14.0 | 20.8 | 7.5 | 12.1 |
| 180 minutes, mg./dl |  |  | 15.6 | 23.0 | 9.7 | 14.0 |
| 240 minutes, mg./dl |  |  | 17.2 |  | 9.7 | 16.2 |

Mg./dl.=Milligrams dissolved salt/diciliter of solution.

EXAMPLE 2

Comparison of decomposition speed between a disodium 5'-nucleotide and the corresponding calcium salt in phosphatase-containing food.

(i) Pork: To 100 gs. of ground pork (containing 3% table salt), 5'-guanylic acid in the form of the calcium salt or disodium salt was added in an amount corresponding to 50 mgs. percent (based on guanylic acid) of the pork, dispersed sufficiently homogeneously, and permitted to stand at 55° C. At 20-minute intervals, the mixture was tested for the residual amount of 5'-guanylic acid.

The results of the tests are shown in Table 1. The numerals given in this table represent quantities, in mgs. of 5′-guanylic acid found to be remaining in 100 gs. of sample. These quantities exclude the quantity of 5′-guanylic acid which the raw material contained originally.

TABLE 1

| Time (min.) | 0 | 20 | 40 | 60 | 80 |
|---|---|---|---|---|---|
| Calcium salt | 50.0 | 38.0 | 29.0 | 26.5 | 25.0 |
| Disodium salt | 50.0 | 25.5 | 19.8 | 14.0 | 12.0 |

(ii) Flour: To flour, water was added in an amount corresponding to 30% of the flour and kneaded sufficiently. Then, to the resulting dough, 5′-inosinic acid and 5′-guanylic acid (1:1) were added, each in an amount corresponding, as 5′-nucleotide, and 50 mgs. percent of the dough, then mixed sufficiently, and allowed to stand at room temperature. At different intervals, the mixture was tested for the residual amount of these acids. The test results are given in Table 2.

TABLE 2

| Time (min.) | 0 | 5 | 30 | 60 | 120 |
|---|---|---|---|---|---|
| Ca salt | 50.0 | 49.2 | 48.1 | 46.8 | 42.1 |
| Na salt | 50.0 | 26.1 | 15.1 | 11.1 | 8.0 |

As is apparent from these tables, calcium salts of 5′-nucleotides have an extremely low rate of dissolution. The discovery of this fact has led to the accomplishment of the present invention, according to which the food is subjected to a heat treatment prior to sufficient dissolution of calcium salt of 5′-nucleotide whereby the added 5′-nucleotide will remain substantially undecomposed by phosphatase in the food, enabling the food to be improved substantially in the taste thereof. This characteristic effect of the addition of the calcium salt of a 5′-nucleotide cannot be expected of the disodium salt.

When the calcium salt of a 5′-nucleotide is added in an amount in excess of solubility, calcium ions will combine with the protein and other substances in the food and the nucleotide will exist in the free state. This means that there is no limitation on the amount of calcium salt of a 5′-nucleotide that may be added.

Now a description will be given of the manner whereby this invention may be put to effect.

The foodstuffs which can be used for this invention include butcher's meat, poultry meat, whale meat and fish meat in the area of animal food, cabbage, onion, radish, leek, stone-leek, Chinese cabbage, carrot, lettuce, spinach, wheat flour, rice and so forth in the area of vegetables, and ham, sausage, canned food, fermented food, sauce, soup stock, corned beef, hamburger, noodles, pastry and confectionery, fried food, roasted food, and assorted Chinese dishes in the area of processed food. These foodstuffs invariably contain phosphatase in their raw materials and consequently permit the calcium salt of a 5′-nucleotide to manifest its effectiveness more advantageously than the disodium salt.

As for the calcium salts of 5′-nucleotides, that are usable for this invention, there may be cited calcium 5′-guanylate, calcium 5′-inosinate, calcium 5′-uridylate, calcium 5′-cytidylate, and calcium 5′-xanthylate, of which the first two are the most desirable.

With the ease of dispersion and the prevention of decomposition taken into consideration, the particle size of the calcium salt of 5′-nucleotide is most desirably in the range of from 50-mesh pass to 200-mesh stop.

The ratio at which the calcium salt of the 5′-nucleotide is added to the food according to this invention is desirably in the range of from 0.01 to 0.2%, though it may depend upon the kind of 5′-nucleotide and the kind of food.

Although it is desirable to added the calcium salt of the 5′-nucleotide while other seasonings are being added prior to the heat treatment, the exact time is not particularly restricted so long as it precedes the heat treatment. In the light of the nature of this invention, it is desirable to minimize the time intervening between the stage of taste-conditioning due to the addition of calcium salt of 5′-nucleotide and the stage of heat treatment.

EXAMPLE I.—FISH SAUSAGE

As the base material for fish sausage, there was used a mixture of pollack (50%), tuna (30%) and lean meat of whale (20%). To 16.5 kgs. of this blended meat, there was added 550 gs. of table salt, 88 gs. of monosodium glutamate, 1540 gs. of starch, 176 gs. of spices, 264 gs. of sugar, 880 gs. of fat, 0.5 liter of egg white solution, and 2.2 liters of ice water as the auxiliary materials.

The fish meat mixture as the base material was ground by a chopper and then blended intimately by a silent cutter. On the other hand, to the auxiliary materials, excluding fat and egg white solution, a 1:2 mixture of calcium 5′-inosinate and calcium 5′-guanylate was added in an amount corresponding, as 5′-guanylic acid and 5′-inosinic acid to 75 mgs. percent based on the total raw materials. The resulting mixture was added to and blended intimately for 5 minutes with said mixture in the silent cutter. Thereafter, the egg white solution and the fat were added thereto in the sequence mentioned. The same materials were seasoned with a 1:2 mixture of sodium 5′-inosinate and sodium 5′-guanylate which was added similarly in an amount corresponding, as 5′-guanylic acid and 5′-inosinic acid, to 75 mgs. percent of the total raw materials.

The mixed meat thus seasoned was forced into tubular cases 3 cms. in diameter and 110 gs. in weight by the aid of a stuffer, heated in a hot water kept at 85° C. for 50 minutes, and thereafter cooled to provide a fish sausage.

The residual ratio of 5′-inosinic acid and 5′-guanylic acid in the product incorporating their calcuim salts was found to be 88% as compared with 47% in the product incorporating their disodium salts.

EXAMPLE II.—BOLOGNA SAUSAGE

Beef and pork were separately treated and left to stand for 2 days to be impregnated with table salt and potassium nitrate added thereto. Then, they were removed and ground by separate meat choppers. Lean meat from each ground meat was put together and treated by a cutter. To the mixed meat being cut, 5′-guanylic acid was added in the form of the calcium salt in one sample lot and the disodium salt in the other sample lot, in an amount corresponding, as 5′-guanylic acid, to 70 mgs. percent based on the total weight of the meat used, and seasoned sufficiently by adding thereto other seasoning agents. Then, the resultant meat paste, after addition thereto of fat, was forced into a tubular case with the aid of a stuffer. The case was bound at intervals of 25 cms. Finally, the case was dried at 40° C. for 1 hour, smoked at 65° C. for 3 hours, heated in water at 75° C. for 1.5 hours, and cooled to provide a Bologna sausage. The residual ratio of 5′-guanylic acid in the product incorporating its calcium salt was found to be 60% as compared with 32% in the product incorporating its disodium salt.

EXAMPLE III.—CANNED SALMON

A salmon was washed with sea water, decapitated by a head cutter, deprived of an ovary, if any, and cut open in the abdominal section to remove internal organs, and cleaned with fresh water. The salmon was cut in round slices having a height suitable for the can height. The round slices of salmon were placed in cans, 220 gs. each, by a fitting machine. To each can of sliced salmon was added 2.5 gs. of table salt and such quantity of 5′-inosinic acid, in the form of the calcium salt in one sample lot and the disodium salt in the other sample lot, as would correspond, as 5′-inosinic acid, to 50 mgs. percent based on the total quantity of the contents. Then, each can was hermetically sealed by a vacuum can-sealer, sterilized at 115.5° C. for 80 minutes, and cooled. The residual ratio of 5′-inosinic acid in the product was found to be 87% in the meat incorporating the calcium salt of 5′-inosinic acid as compared with 52% in the meat incorporating the disodium salt thereof.

EXAMPLE IV.—PICKLE

Cucumbers were washed with water, drained of water, and left to be impregnated with suitable quantities of dill and laurel and, after addition thereto of water in which there had been sufficiently dissolved or extracted in advance, pepper, table salt, grape sugar, dill ground pepper, clove, cinnamon, laurel, capsicum, monosodium glutamate, and sodium dehydroacetate, weighted with a 40- to 50-kgs. stone, and left to ferment at 20° C. for 20 days. After the fermentation, the cucumbers were packed in cans to a weight of 200 gs. per can. To each can of pickled cucumbers, 5'-guanylic acid was added, in the form of the calcium salt in one sample lot and the disodium salt in the other sample lot, by an amount corresponding, as 5'-guanylic acid, to 30 mgs. percent based on the contents of the can. Then, each can was sealed by a vacuum sealer, sterilized at 85° C. for 30 minutes, and cooled.

The residual ratio of 5'-guanylic acid was found to be 62% in the product incorporating the calcium salt of 5'-guanylic acid as compared with 25% in the product containing the disodium salt thereof.

What we claim is:

1. A method of manufacturing food products containing phosphatase in the raw materials or components thereof, comprising the steps of:

admixing to said food components at least one of the calcium salts of 5'-nucleotide that has a particle size in the range of from 50-mesh pass to 200-mesh stop and then heat treating the mixture thereof to deactivate the phosphatase contained therein, said step of heat treatment effecting dissolution of said calcium salts of 5'-nucleotide so that said salts remain substantially undecomposed by phosphatase in the food prior to said heat treatment.

2. The method of manufacturing food products as claimed in claim 1, wherein the phosphatase-containing food is of the type capable of being solated and solating said food after the step of heat treatment.

3. The method of manufacturing food products as claimed in claim 1, wherein said calcium salt of 5'-nucleotide is selected from the group consisting of calcium 5'-inosinate, calcium 5'-guanylate, calcium 5'-uridylate, calcium 5'-cytidylate and calcium 5'-xanthylate.

4. A method of manufacturing food products as claimed in claim 1, said food being of the type capable of gelating, and gelating said food after the step of said heat treating.

5. A method of manufacturing food products as claimed in claim 1, said food being of the type capable of solidification, and solidifying said food after the step of said heat treating.

6. A method of manufacturing food products as claimed in claim 1, said calcium salts of 5'-nucleotide being added in an amount in excess of its solubility in said food, whereby calcium ions combine with raw material components of said food and the nucleotide remains in the food in a free state.

7. A method of manufacturing food products as claimed in claim 1, said calcium salts of 5'-nucleotide being admixed in proportion of from 0.01% to 0.2%.

8. A method of manufacturing food products as claimed in claim 1, said step of heat treating being carried out immediately after the said step of admixing said calcium salts.

9. A method of manufacturing food products as claimed in claim 1, said raw material components including a fish meat mixture, salt, monosodium glutamate, starch, spices, sugar and water in the proportions of about 16.5 kg.; 550 gr.; 1540 gr.; 176 gr.; 264 gr.; 880 gr.; and 2.2 liters respectively and said calcium salts of 5'-nucleotide being admixed at about 75 mg. percent, of said raw materials and said step of heating performed at a temperature of about 85° C. for about 50 minutes, whereby the residual ratio of said calcium salts of 5'-nucleotides is about 88%.

10. A method of manufacturing food products as claimed in claim 1, said raw material components including chopped meat; said calcium salts of 5'-nucleotide being admixed in proportion of about 70 mg. percent based on the total weight of the said meat, said method further comprising prior to the step of heating the steps of:

drying said food at about 40° C. for about one hour;
smoking said food at about 65° C. for about 3 hours; and
heating said food at about 75° C. for about 1 and ½ hours, whereby the residual ratio of said calcium salts of 5'-nucleotide is about 60%.

11. A method of manufacturing food products as claimed in claim 1, said raw material components including vegetable food with seasonings in mixture; further comprising prior to said step of heating the steps of:

compressing said mixture above atmospheric pressure;
permitting fermentation thereof for about 20 days;
said calcium salts of 5'-nucleotide being admixed to the fermented mixture in proportions of about 30 mg. percent and vacuum sealing said mixture;
said step of heating comprising sterlizing the vacuum sealed mixture at about 85° C. for about 30 minutes and subsequently cooling it, whereby the residual ratio of said calcium salts of 5'-nucleotide is about 62%.

References Cited

UNITED STATES PATENTS

| 3,231,385 | 1/1966 | Ziro et al. | 99—54XN |
| 3,389,000 | 6/1968 | Fujita et al. | 99—140N |

FOREIGN PATENTS

| 1,367,313 | 6/1964 | France | 99—140N |

MORRIS O. WOLK, Primary Examiner

W. BOVEE, Assistant Examiner